US011725889B1

(12) United States Patent
Kustas et al.

(10) Patent No.: US 11,725,889 B1
(45) Date of Patent: Aug. 15, 2023

(54) REFRACTORY HIGH ENTROPY ALLOY COMPACT HEAT EXCHANGER

(71) Applicant: National Technology & Engineering Solutions of Sandia, LLC, Albuquerque, NM (US)

(72) Inventors: Andrew Kustas, Albuquerque, NM (US); Salvador B. Rodriguez, Albuquerque, NM (US); Shaun R. Whetten, Rio Rancho, NM (US); Darryn Fleming, Albuquerque, NM (US); Nicolas Argibay, Albuquerque, NM (US); Deidre Hirschfeld, Tijeras, NM (US); Logan Madacey Rapp, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 515 days.

(21) Appl. No.: 16/800,207

(22) Filed: Feb. 25, 2020

Related U.S. Application Data

(60) Provisional application No. 62/810,723, filed on Feb. 26, 2019.

(51) Int. Cl.
*F28F 21/00* (2006.01)
*F28F 21/08* (2006.01)
*F01K 25/10* (2006.01)

(52) U.S. Cl.
CPC .......... *F28F 21/086* (2013.01); *F01K 25/103* (2013.01)

(58) Field of Classification Search
CPC ...... F28F 7/02; F28F 2260/00; F28F 2260/02; F28F 21/086; F28F 2250/104;
(Continued)

(56) References Cited

U.S. PATENT DOCUMENTS 1,571,068 A * 1/1926 Stancliffe .................. F28F 7/02
165/165
3,000,734 A * 9/1961 Grant ........................ C22C 1/10
419/10
(Continued)

OTHER PUBLICATIONS

Kukshal et al., "Effect of Mn on corrosion and thermal behavior of AlCr1.5CuFeNi2Mnx high-entropy alloys", International Conference on Mechanical , Materials and Renewable energy (Year: 2018).*

(Continued)

*Primary Examiner* — Harry E Arant
(74) *Attorney, Agent, or Firm* — Kevin W. Bieg

(57) ABSTRACT

Several innovative technologies, including pressure-drop minimization, advanced refractory high entropy alloys, and advanced manufacturing can provide a compact heat exchanger that extends the state-of-the-art heat-exchanger operating range. The compact heat exchanger can reduce pressure drop losses by 100 to 500%, while retaining most of the heat transfer. The compact heat exchanger can be fabricated from refractory high entropy alloys that have favorable corrosion, thermal fatigue, and creep properties at high temperatures and pressures. Therefore, the compact heat exchanger using high entropy alloys can operate at >800° C. and 80 bars.

9 Claims, 4 Drawing Sheets

(58) Field of Classification Search
CPC .......... F28F 2250/106; F28F 2250/108; F28D 1/0246; F28D 7/0025; F28D 7/0041; F28D 7/0058; F28D 7/16; F28D 7/1684
See application file for complete search history.

(56) References Cited

U.S. PATENT DOCUMENTS

| | | | | |
|---|---|---|---|---|
| 3,269,459 | A * | 8/1966 | Popovitch | F28D 7/106 165/140 |
| 4,019,899 | A * | 4/1977 | Negishi | C22C 14/00 420/441 |
| 4,711,298 | A * | 12/1987 | Rogier | F28F 7/02 165/165 |
| 7,570,145 | B2 * | 8/2009 | Yeh | H01F 10/131 336/233 |
| 8,211,548 | B2 * | 7/2012 | Chun | C22C 38/38 428/469 |
| 8,286,695 | B2 * | 10/2012 | Greaney | C22C 38/22 165/134.1 |
| 8,337,584 | B2 * | 12/2012 | Billieres | C03B 9/48 75/252 |
| 8,470,097 | B2 * | 6/2013 | Chun | C22C 38/44 148/240 |
| 9,150,945 | B2 * | 10/2015 | Bei | C22C 30/00 |
| 10,537,839 | B1 | 1/2020 | Fleming et al. | |
| 2002/0159914 | A1 * | 10/2002 | Yeh | C22C 1/02 420/580 |
| 2003/0173720 | A1 * | 9/2003 | Musso | C04B 35/00 264/635 |
| 2004/0123621 | A1 * | 7/2004 | Okaza | F25B 39/02 62/468 |
| 2004/0206109 | A1 * | 10/2004 | Nishiwaki | F28F 1/022 62/468 |
| 2005/0039897 | A1 * | 2/2005 | Muto | F25B 40/00 165/164 |
| 2006/0016587 | A1 * | 1/2006 | Bouzon | F28F 1/022 165/166 |
| 2006/0059945 | A1 * | 3/2006 | Chordia | C09K 5/041 62/498 |
| 2007/0144631 | A1 * | 6/2007 | Clavenna | C21D 10/00 148/558 |
| 2007/0158054 | A1 * | 7/2007 | Greaney | F28F 19/06 165/133 |
| 2007/0178322 | A1 * | 8/2007 | Chun | F28F 25/08 428/469 |
| 2007/0187078 | A1 * | 8/2007 | Greaney | C10G 9/203 165/158 |
| 2008/0150663 | A1 * | 6/2008 | Yeh | H01F 17/0006 336/83 |
| 2009/0101321 | A1 * | 4/2009 | Ostersetzer | F28F 3/025 165/164 |
| 2010/0132409 | A1 * | 6/2010 | Billieres | C23C 4/08 65/374.12 |
| 2010/0162749 | A1 * | 7/2010 | Yoshimura | F28F 9/0202 62/498 |
| 2012/0039430 | A1 * | 2/2012 | Abel | F01K 3/181 376/325 |
| 2012/0273091 | A1 * | 11/2012 | Chun | C22C 38/48 148/281 |
| 2013/0108502 | A1 * | 5/2013 | Bei | C22C 30/00 420/591 |
| 2014/0174703 | A1 * | 6/2014 | Yoshioka | F28F 9/0278 165/173 |
| 2015/0260463 | A1 * | 9/2015 | Laughlin | F02C 6/14 165/10 |
| 2016/0131443 | A1 * | 5/2016 | Oliva | F28F 7/02 165/164 |
| 2017/0010054 | A1 * | 1/2017 | Citti | F28F 9/0229 |
| 2017/0089643 | A1 * | 3/2017 | Arafat | F28D 9/0093 |
| 2017/0198977 | A1 * | 7/2017 | Herring | F28D 7/0066 |
| 2017/0198978 | A1 * | 7/2017 | Kuczek | F28D 7/0066 |
| 2017/0198979 | A1 * | 7/2017 | St. Rock | F28F 21/062 |
| 2017/0205146 | A1 * | 7/2017 | Turney | F28F 1/025 |
| 2017/0205149 | A1 * | 7/2017 | Herring | F28D 7/0025 |
| 2017/0209908 | A1 * | 7/2017 | Smathers | B23K 15/0086 |
| 2017/0218480 | A1 * | 8/2017 | Park | C23F 1/30 |
| 2017/0314862 | A1 * | 11/2017 | Vestergaard | B21C 23/085 |
| 2018/0002623 | A1 * | 1/2018 | Noekleby | B01D 19/0036 |
| 2018/0025794 | A1 * | 1/2018 | Lahoda | C23C 4/134 376/409 |
| 2018/0038654 | A1 * | 2/2018 | Popp | F28D 7/1684 |
| 2018/0179914 | A1 * | 6/2018 | Larochelle | F01K 25/103 |
| 2018/0187984 | A1 * | 7/2018 | Manzo | F28F 7/02 |
| 2018/0238627 | A1 * | 8/2018 | Herring | F28D 7/0016 |
| 2019/0024198 | A1 * | 1/2019 | Hong | C22C 32/0078 |
| 2019/0033013 | A1 * | 1/2019 | Byfield | B33Y 80/00 |

OTHER PUBLICATIONS

Ngo, T. L. et al., "Heat Transfer and Pressure Drop Correlations of Microchannel Heat Exchangers with S-Shaped and Zigzag Fins for Carbon Dioxide Cycles", Experimental Thermal and Fluid Science, vol. 32 (2007), pp. 560-570.
Senkov, O. N. et al., "Development and Exploration of Refractory High Entropy Alloys—A Review", Journal of Materials Research, vol. 33 (2018), pp. 3092-3128.
Vitillo, F. et al., "Flow Analysis of an Innovative Compact Heat Exchanger Channel Geometry", International Journal of Heat and Fluid Flow, vol. 58 (2016,) pp. 30-39.
Chordia, L. et al., "High Temperature Heat Exchanger Design and Fabrication for Systems with Large Pressure Differentials", Technical Report, 2017, DOI: 10.2172/1349235., 174 pages.
Cantor, B. et al., "Microstructural Development in Equiatomic Multicomponent Alloys", Materials Science & Engineering A, vol. 375-377 (2004), pp. 213-218.
Yeh, J-W. et al., "Nanostructured High-Entropy Alloys with Multiple Principal Elements: Novel Alloy Design Concepts and Outcomes**", Advanced Engineering Materials, vol. 6, No. 5 (2004), pp. 299-303.
Miracle, D. B. and Senkov, O.N., "A Critical Review of High Entropy Alloys and Related Concepts", Acta Materialia, vol. 112 (2017), pp. 448-511.
Waseem, O. A. and Ryu, H. J. "Powder Metallurgy Processing of a WxTaTiVCr High-Entropy Alloy and Its Derivative Alloys for Fusion Material Applications", Scientific Reports, vol. 7, 1926 (2017), 14 pages.
Kustas, A. B. et al., "Characterization of the Fe—Co-1.5V Soft Ferromagnetic Alloy Processed by Laser Engineered Net Shaping (LENS)", Additive Manufacturing, vol. 21 (2018), pp. 41-52.
Senkov, O. et al., "Mechanical Properties of Nb25Mo25Ta25W25 and V20Nb20Mo20Ta20W20 Refractory High Entropy Alloys", Intermetallics, vol. 19 (2011), pp. 698-706.
Kunce, I. et al., "Microstructure and Hydrogen Storage Properties of a TiZrNbMoV High Entropy Alloy Synthesized Using Laser Engineered Net Shaping (LENS)", International Journal of Hydrogen Energy, vol. 39 (2014), pp. 9904-9910.
Dobbelstein, H. et al., "Laser Metal Deposition of a Refractory TiZrNbHfTa High-Entropy Alloy", Additive Manufacturing, vol. 24 (2018), pp. 386-390.
Chen S. et al., "Additive Manufacturing of High-Entropy Alloys: A Review", Entropy, vol. 20 (2018), 18 pages.
Tiwari, R. et al., "Development of an Additive Manufacturing-Enabled Compact Manifold Microchannel Heat Exchanger", Applied Thermal Engineering, vol. 147 (2019), pp. 781-788.
Zhang, X. et al., "Recent Developments in High Temperature Heat Exchangers: A Review", Frontiers Heat and Mass Transfer, vol. 11, No. 18 (2018), 14 pages.
Southall, D. et al., "Design Considerations for Compact Heat Exchangers," Proc. ICAPP '08, Paper 8009, Anaheim, CA (2008), 16 pages.
Sekulic, D.P., "Compact Heat Exchangers," in Handbook of Thermal Science and Engineering, Springer (2018), pp. 1501-1520.

* cited by examiner

REFRACTORY HIGH ENTROPY ALLOY COMPACT HEAT EXCHANGER

CROSS-REFERENCE TO RELATED APPLICATION

This application claims the benefit of U.S. Provisional Application No. 62/810,723, filed Feb. 26, 2019, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to heat exchange technology and, in particular, to a refractory high entropy alloy compact heat exchanger.

BACKGROUND OF THE INVENTION

Power cycles based on super-critical carbon dioxide ($sCO_2$) as the working fluid have the potential to yield higher thermal efficiencies at lower capital cost than state-of-the-art steam-based power cycles. When carbon dioxide ($CO_2$) is held above its critical temperature and pressure, it acts like a gas yet has the density of a liquid. In this supercritical state, small changes in temperature or pressure cause dramatic shifts in density—making $sCO_2$ a highly efficient working fluid to generate power. Further, due to its superior thermal stability and non-flammability, direct heat exchange from high temperature sources is possible, permitting higher working fluid temperatures and therefore higher cycle efficiency. However, despite the promise of substantially higher efficiency and lower capital costs, the use of $sCO_2$ presents material selection and design issues for power generation components.

Heat exchangers operating at high temperatures (e.g., >500° C.) are subject to unique material challenges, such as creep, reduced strength at higher temperatures, oxidation, corrosion, and thermal shock. Most conventional metallic materials do not provide adequate combinations of materials properties for next-generation heat exchangers, wherein high pressures and temperatures are required, and thus have lower efficiency and operational range. In particular, conventional materials lose their thermo-mechanical properties at elevated temperatures. Therefore, expensive alloys that retain their strength at high temperature, such as high-grade steels and Ni-based alloys, are typically used in high temperature heat exchangers. The high cost of heat exchangers in power plant operations, such as $sCO_2$ Brayton cycles, is a major impediment to making the cycle economical. See L. Chordia et al., *High Temperature Heat Exchanger Design and Fabrication for Systems with Large Pressure Differentials*, Technical Report, (2017) DOI: 10.2172/1349235.

Therefore, compact heat exchangers (CHEs) are being developed that have higher surface area to volume ratio, thus using the expensive material more efficiently. See Zhang et al., *Front. Heat Mass Transf.* 11, 18 (2018). Indeed, CHEs have been designed for at least three decades. See D. Southall et al., "Design Considerations for Compact Heat Exchangers", *Proceedings of ICAPP '08*, Paper 8009, Anaheim, Ca, 2008. Typical compact designs use hundreds to thousands of small channels with diameters on the order of 1 mm to achieve higher surface areas. One significant improvement of CHEs over conventional heat exchangers is the reduced CHE size per unit of heat transfer. There are many CHE microchannel geometries, including zigzag, S-shape, airfoil, and crossflow. However, due to their small diameter, the frictional force required to overcome the flow resistance is high, resulting in a large pressure drop. Interestingly, the current literature indicates that reducing swirl and mixing will result in a reduced pressure drop. See T. I. Ngo et al., *Exp. Therm. Fluid Sci.* 32, 560 (2007). However, other recent literature indicates the contrary—that increased cross-flow mixing results in a smaller pressure drop. See F. Vitillo et al., *Int. J. Heat Fluid Fl.* 58, 30 (2016).

SUMMARY OF THE INVENTION

The present invention is directed to a compact heat exchanger comprising a plurality of flow channels constructed of a refractory high entropy alloy, wherein a diameter of the flow channels is optimized to minimize pressure drop while maintaining sufficient mixing for heat transfer. For example, the refractory high entropy alloy can comprise HfNbTaTiV, HfNbTaTiZr, MoNbTaVW, HfNbTaTiZr, WTaTiVCr, MoNbHfZrTi, or similar alloys. The flow of working fluid in the flow channels can have a Reynolds Number between 2,400 and 4,000 with a pressure drop, $\Delta P/P$, of less than 1.5%. The compact heat exchanger can comprise a square array of flow channels with cross flow or countercurrent flow. The flow channels can have a hydraulic diameter of between 2 and 3 mm. The compact heat exchanger can be fabricated using conventional manufacturing or an advanced manufacturing process.

As an example, a CHE was designed for $sCO_2$, comprising a square array of 35×35 tubes with flow of 46.5 kg/m²-s. The Reynolds Number in the tubes is about 2,400 with a pressure drop of about 1.3%. The channel hydraulic diameter was 2.2 mm. The compact heat exchanger can be fabricated with HfNbTaTiV, which has an estimated compressive yield strength of about 1,300 MPa at room temperature and a temperature range up to about 1,400 K.

BRIEF DESCRIPTION OF THE DRAWINGS

The detailed description will refer to the following drawings, wherein like elements are referred to by like numbers.

DETAILED DESCRIPTION OF THE INVENTION

According to the present invention, several innovative technologies, including pressure-drop minimization, advanced refractory high entropy alloys (RHEAs), and advanced manufacturing (AM) can be used to extend the state-of-the-art (SOA) heat-exchanger operating range. The CHE design can be optimized to allow sufficient turbulence and heat transfer, while reducing the pressure drop. Recent breakthroughs in hybrid AM and advanced alloys can significantly extend the heat-exchanger temperature and pressure operational range. In particular, AM can use RHEAs that have excellent high-temperature microstructure and mechanical stability. Microstructure control of the RHEA can further increase high-temperature endurance, as well as corrosion, creep, and thermal fatigue resistance.

Pressure-Drop Minimization

Turbulence can be optimized to reduce pressure drop in such a way that there is sufficient mixing (e.g., sufficient turbulence, and therefore heat transfer), while not generating an excessive pressure drop. This can be achieved by optimizing the Reynolds number (Re) and using channel diameters that allow for adequate Taylor eddy scale production for isotropic mixing near the wall.

Many current heat exchangers operate at wastefully-large Re, thereby incurring costly pressure drop while only marginally increasing the heat transfer. This is important, as pumping costs reduce the net power output of power plants, and thus impact the overall cost of electricity. By using first principles in fluid dynamics, pressure drop losses can be reduced by 100 to 500%, while retaining most of the heat transfer, as measured by the Nusselt number (Nu). See L. Chordia et al., "High Temperature Heat Exchanger Design and Fabrication for Systems with Large Pressure Differentials", Technical Report, (2017) DOI: 10.2172/1349235. The wasteful pressure drop can be reduced by optimizing the heat exchanger channel diameter such that a minimum turbulent Re is reached, thereby ensuring sufficient turbulence for effective mixing and heat transfer. Most importantly, Re can be constrained such that an excessive pressure drop does not occur.

Figure 1:
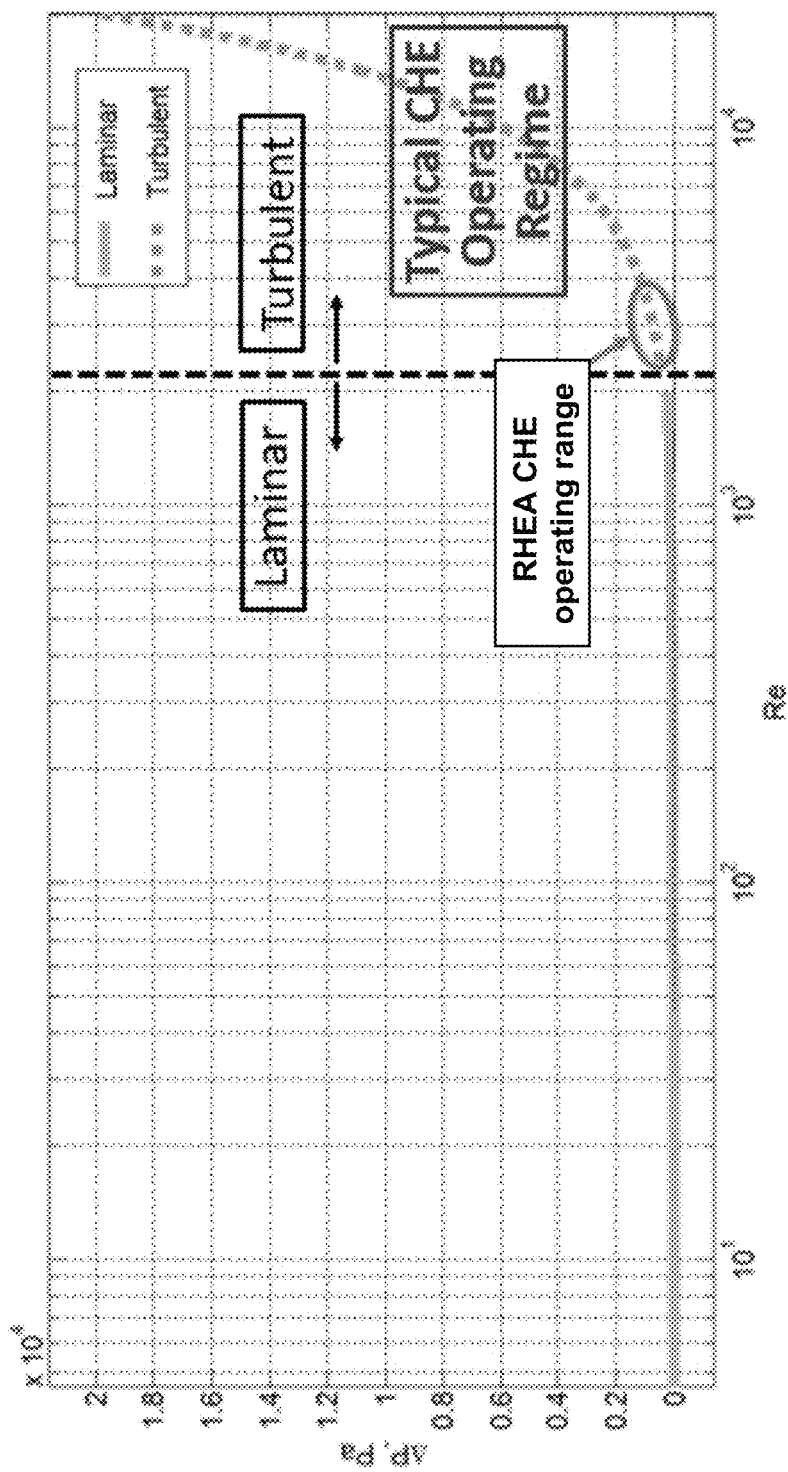
FIG. 1 is a graph of flow pressure drop at compact heat exchanger operational conditions. The desired operating range for the refractory high entropy alloy compact heat exchanger of the present invention is 2,400<Re<4,000 with a pressure drop, $\Delta P/P$, of less than 1.5%.

Because CHEs are important components in $sCO_2$ loops and given the current lack of consensus regarding the cause for the large pressure drop, a strong impetus rose for the usage of computational fluid dynamics (CFD) to investigate this phenomenon. See D. C. Wilcox, *Turbulence Modeling for CFD*, 3rd Ed., DCW Industries, Inc. (2006). In addition, the CFD analysis sought to determine which CHE designs are more suitable for $sCO_2$ loops. Straight tube, S-shape, and airfoil designs were considered. The simulations converged to the same conclusion: all three designs showed an exponential increase in pressure drop ($\Delta P$) once the flow transitioned from laminar to turbulent, as shown in FIG. 1. In particular, once a flow becomes turbulent, its pressure drop becomes proportional to the mass flow rate to the 7/4th power, instead of to the first power for laminar flows. The large pressure drop occurs as a result of the energy that the turbulence eddies consume as they mix the flow. Therefore, Re can be limited so that the flow is marginally turbulent, but not excessively turbulent. Then, to compensate for the lower Re, mixing and heat transfer near the wall can be maximized, albeit at a lower pressure drop. Basically, turbulence induces strong mixing and heat transfer primarily as a result of the integral and Taylor eddy motion. The CHE can be sized such that it promotes the formation of Taylor eddies for isotropic mixing.

Two design criteria can be specified such that the minimum pressure drop is incorporated as part of the CHE design. The criteria are straightforward to calculate and applicable for any internal CHE geometry and coolant. In particular, the optimum CHE channel diameter can be calculated such that the pressure drop is minimized.

For forced convection, Re is a critical CHE design parameter. Larger Re implies higher heat transfer, as evidenced by the Dittus-Boelter correlation. See J. Holman, *Heat Transfer*, 7th Ed., McGraw-Hill, Inc. (1990). Recent studies show that the Dittus-Boelter correlation also applies reasonably well to CHEs, despite its applicability in the range of Re≥10,000; CHEs typically operate in the range of Re=1,000 to 20,000. See T. I. Ngo et al., *Exp. Therm. Fluid Sci.* 32, 560 (2007). The Dittus-Boelter correlation is:

$$Nu = \frac{hx}{k} = 0.023 Re^{4/5} Pr^n \tag{1}$$

where
n=0.4 when fluid is heated; 0.3 when cooled,
Nu=Nusselt number (larger Nu results in more convective heat transfer),
h=convective heat transfer coefficient,
x=characteristic length (e.g., diameter D),
k=fluid thermal conductivity, and
Pr=Prandtl number.
Re is defined as $$Re = \frac{D\bar{u}\rho}{\mu} \tag{2}$$

where
D=channel diameter,
$\bar{u}$=average flow velocity,
$\rho$=fluid density, and
$\mu$=fluid dynamic viscosity.
From conservation of mass at steady state, the mass flow rate is $$\dot{m}=\rho\bar{u}A, \text{ or} \tag{3a}$$

$$\bar{u} = \frac{\dot{m}}{\rho A} \tag{3b}$$

where A is the flow area.
Substituting Equation (3b) into (2), $$Re = \frac{D\bar{u}\rho}{\mu} = \frac{D\rho}{\mu}\frac{\dot{m}}{\rho A} = \frac{D\dot{m}}{\mu A} \tag{4}$$

As noted from Equation (1), higher Re will result in a higher level of heat transfer, as measured by a larger Nu (or h). Equation (4) shows that a larger Re is obtainable by using larger D, which is usually on the order of 10 to 100 mm for industrial applications.

Therefore, the first design criteria can be specified by setting the flow regime such that it maximizes Re while keeping the flow only marginally turbulent. This ensures that the benefits of turbulent flow are included in the design (e.g., eddies are generated which induce strong mixing and therefore good heat transfer), while the excessive pressure drop associated with strong turbulence does not occur, as evidenced from FIG. 1. For turbulent flow, the transition occurs at approximately Re=Re$_{Crit}$~2,200. To ensure turbulence, an additional amount of 10% can be added. That is, Re$_{Crit}$ can be set as:

$$Re_{Crit} = \frac{D\dot{m}}{\mu A} \leq 2,200 + 200 \quad (5a)$$

Then, solving for the optimum diameter, D:

$$D \leq 2,400 \frac{\mu A}{\dot{m}} \quad (5b)$$

Equation (5b) defines the maximum diameter allowed to maximize heat transfer while allowing the CHE to run at its pressure drop minima.

The second design criteria can be specified such that the minimum D must not be smaller than the Taylor eddy length, $\lambda$. This ensures that Taylor eddies can form and mix within the fluid. This criterion is stated as:

$$D \geq \lambda \quad (6)$$

Equations (5b) and (6) can now be written succinctly as the two novel CHE design criteria using a single formulation:

$$\lambda \leq D \leq 2,400 \frac{\mu A}{\dot{m}} \quad (7)$$

Equation (7) is useful for any CHE that uses any gas or liquid, including supercritical gases, water, organics, molten metals, and salts. The formulation is applicable when the desired mass flow rate is specified.

The small CHE channels are within an order of magnitude of the size of the Taylor eddies, and therefore the channel tubes mimic the eddy behavior. Because the channels are sufficiently small, there is no further need for additional turbulence mixing, which would create an excessive pressure drop for a system that is already well-mixed by the small channels. Thus, any additional turbulent mixing only generates minimal heat transfer improvement and produces an excessive pressure drop because the fluid is already well-mixed by the small tubes. Therefore, eliminating the unneeded additional turbulence is highly desirable for CHEs.

Refractory High Entropy Alloys

Current heat exchanger operations are generally limited to ~500° C. at 300 bar, with research programs achieving operation at similar pressures with temperatures at 700-750° C. See X. Zhang et al., *Front. Heat Mass Transf.* 11, 18 (2018); and L. Chordia et al., "High Temperature Heat Exchanger Design and Fabrication for Systems with Large Pressure Differentials", Technical Report, (2017) DOI: 10.2172/1349235. At higher temperatures approaching 800° C., pressures of a few bars are the limiting operating conditions due to structural issues for the material, where creep, oxidation, and thermal fatigue dominate. The target operating range for next-generation metallic CHEs is at pressures ranging from 80-250 bar and temperatures of 800° C. or higher. SOA materials include both iron-based alloys and nickel-based superalloys. Iron-based alloys generally have suitable mechanical properties up to 600° C. and are relatively inexpensive. However, these alloys are also limited in their corrosion resistance and mechanical properties at higher temperatures. For higher temperature and pressure applications, more expensive Ni-based superalloys are typically utilized. SOA Ni alloys operate at temperatures as high as 816° C., with a recommended operational temperature of 760° C. The top alloy candidate currently in consideration by ASME in this class of material is the Haynes 282 alloy, which is expected to have similar performance limitations. X. Zhang et al., *Front. Heat Mass Transf.* 11, 18 (2018); and L. Chordia et al., "High Temperature Heat Exchanger Design and Fabrication for Systems with Large Pressure Differentials", Technical Report, (2017) DOI: 10.2172/1349235. However, SOA conventional alloys and most emerging (next-generation) alloys will require higher corrosion and creep resistance.

High-entropy alloys (HEAs) are metal alloys that comprise equal or relatively large proportions of four or more elements. The term "high entropy alloys" was coined because the entropy increase on solution is substantially higher when there is a larger number of elements in the mix, and their ratios are more nearly equal. HEAs were introduced in 2004 as unique alloys, several of which retain a stable single-phase solid solution microstructure. See B. Cantor et al., *Mater. Sci. Eng. A* 375-377, 213 (2004); J.-W. Yeh et al., *Adv. Eng. Mater.* 6(5), 299 (2004); D. B. Miracle and O. N. Senkov, *Acta Mater.* 122, 448 (2017); O. N. Senkov et al., *J. Mater. Res.* 1, 3092 (2018); and B. S. Murty, *High-Entropy Alloys*, Elsevier (2019). These high entropy alloys have potentially desirable properties, including better strength-to-weight ratios and a higher degree of fracture resistance, tensile strength, as well as corrosion and oxidation resistance than conventional alloys.

Recently, refractory-containing HEAs (RHEAs) have shown promising high-temperature microstructure and mechanical stability. While several RHEAs have single-phase BCC or FCC microstructure, some form intermetallic phases with high strength properties. RHEAs have significantly improved creep resistance as a result of the refractory metals. Additionally, Hf, Nb, Mo, and Ta (major elements of RHEAs) significantly increase high-temperature strength and corrosion resistance. See L. Chordia et al., "High Temperature Heat Exchanger Design and Fabrication for Systems with Large Pressure Differentials", Technical Report, (2017) DOI: 10.2172/1349235; and O. N. Senkov et al., *J. Mater. Res.* 33, 3092 (2018). MoNbTaVW and HfNbTaTiZr are promising RHEAs for temperature and pressure, as well as having promising corrosion, creep, and thermal fatigue properties. Other RHEAs, such as WTaTiVCr and MoNbHfZrTi, also have good properties at high temperature and pressure. See O. A. Waseem and H. J. Ryu, *Scientific Reports* 7, 1926 (2017).

Recent research indicates that the preparation method for high entropy alloys can more than double their strength and hardness due to dispersion and solid-solution strengthening. See O. A. Waseem and H. J. Ryu, *Scientific Reports* 7, 1926 (2017). Thermal and structural properties of RHEAs can be extended through rapid cooling rates that tailor the extent of intermetallic phases, thereby controlling properties more effectively than conventional metallurgy. See A. B. Kustas et al., *Addit. Manuf.* 21, 41 (2018). Such microstructure control can further increase high-temperature endurance, as well as corrosion, creep, and thermal fatigue resistance. This approach also enables exceptional corrosion and mechanical properties by compositionally 'grading' corrosion-resistant elements near the exposed surface. This is ideal for next-generation, advanced heat exchangers.

Figure 2:
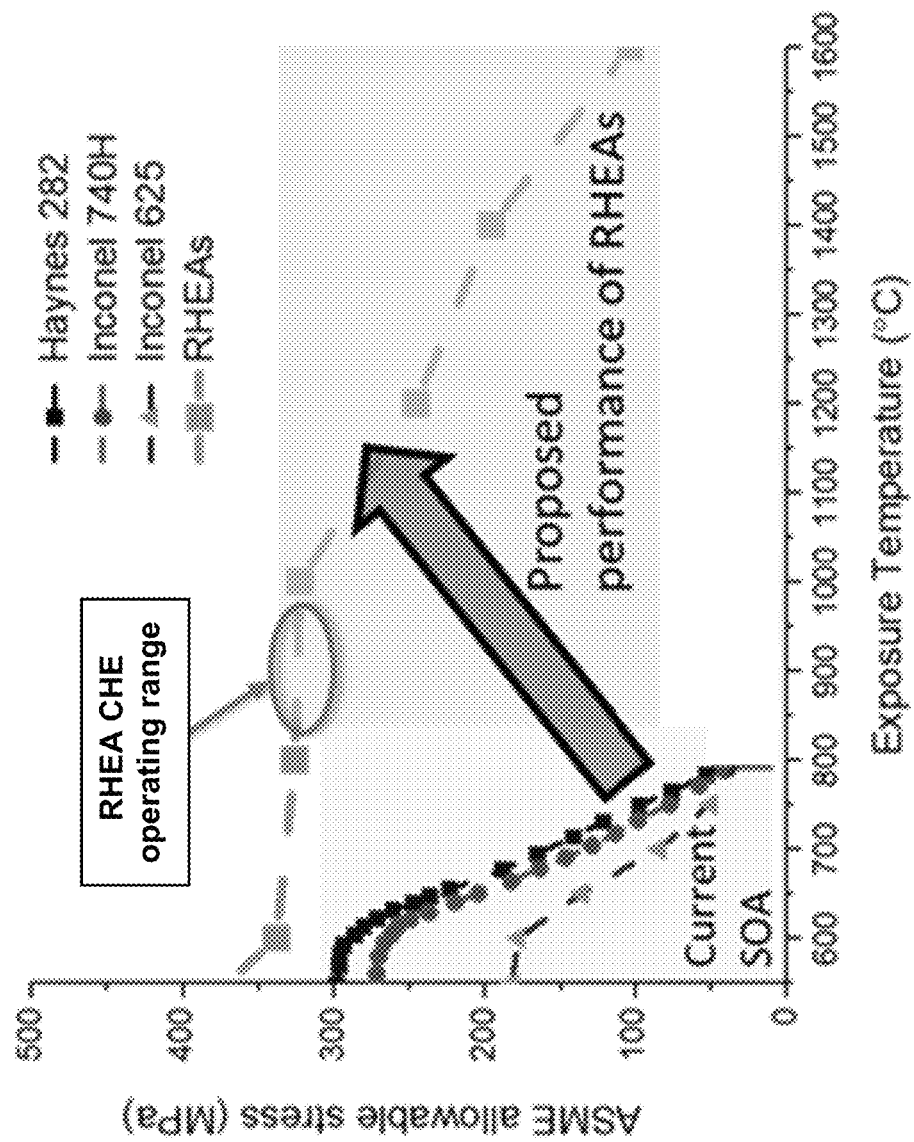
FIG. 2 is a graph of allowable stress vs. temperature for current state-of-the-art metals and refractory high entropy alloys.

In the context of high-temperature heat exchangers, the top performing conventional (metallic) materials (Haynes 282, Inconel 740H, and Inconel 625) are shown in FIG. 2, which shows the ASME allowable stress for select high-temperature materials as a function of operating temperature. See X. Zhang et al., *Front. Heat Mass Transf.* 11, 18 (2018). RHEAs can increase heat exchanger operating conditions to higher pressures and temperatures. RHEAs have already been demonstrated at the bench-scale with yield stress of 7,350 bars (735 MPa) at 1,200° C. See D. B. Miracle and O. N. Senkov, *Acta Mater.* 122, 448 (2017); and O. N. Senkov et al., *J. Mater. Res.* 33, 3092 (2018). Superimposed on FIG. 2 is an estimate of the anticipated allowable stress-temperature properties for a MoNbTaVW RHEA. The estimate is based on the methodology described within the ASME Boiler and Pressure Vessel Code handbook, Mandatory Appendix 1 Table 1-100 for welded pipe or tube that is constructed from ferrous and nonferrous metals; that is, ⅔×0.85*Sy*Ry, where Sy is the specified minimum yield strength at room temperature and Ry is the ratio of average temperature dependent curve values of yield strength to the room temperature value. In determining the values on the RHEA curve, compressive yield strength data was used. See O. N. Senkov et al., *Intermetallics* 19, 698 (2011); and O. N. Senkov et al., *J. Mater. Res.* 33, 3092 (2018).

Refractory High Entropy Alloy Compact Heat Exchanger Example

As described above, the CHE flow channels can be designed such that the Reynolds number (Re) is turbulent, but only marginally so. Therefore, Re=2,400 was chosen for the exemplary CHE design described below. This Re allows for heat transfer that is significantly higher than laminar flow, while only incurring a marginally higher pressure drop.

The working fluid for this exemplary CHE design was supercritical carbon dioxide (sCO$_2$) at 969 K and 8.0 MPa. sCO$_2$ has the following physical properties, which were used to develop the CHE design specifications:
Density=4.30e+001 kg/m$^3$
Thermal conductivity=6.97e−002 W/m-K
Dynamic viscosity=4.07e−005 kg/m-s
Heat capacity at constant pressure=1.24e+003 J/kg-K
Kinematic viscosity=9.46e−007 m$^2$/s
Characteristic length=2.10e−003 m
Pr=0.725

For this exemplary design, the velocity was chosen at 1.08 m/s, so the mass flux was calculated to be 46.5 kg/m$^2$-s. At this value, the pressure drop through the CHE flow channels is as low as possible. In this case, a simple momentum balance shows that the pressure drop through the tubes is 540 Pa. This low pressure drop results in reduced fluid-pumping cost, which is an added benefit of the CHE design.

Many heat transfer correlations are available to calculate the Nusselt number (Nu) and the convective heat transfer coefficient, h (e.g., Sieder-Tate, Colburn j-factor analogy, and Ngo's CHE). See J. E. Hesselgreaves et al., *Compact Heat Exchangers: Selection, Design and Operation*, Butterworth-Heinemann, 2016; J. Holman, *Heat Transfer*, 7$^{th}$ Edition, McGraw-Hill, Inc., 1990; W. M. Kays and A. L. London, *Compact Heat Exchangers*, 3$^{rd}$ Edition, 1984; and T. L. Ngo et al., *Exp. Therm. Fluid Sci.* 32, 560 (2007). For this example, the j-factor approach chosen, with Pr=0.72 and Re=2,400. This yielded a j-factor of 0.009. To compensate for fouling, rust, and imperfections, the j-factor can be conservatively reduced by 20%, to 0.0072. The j-factor is expressed as $$j = \frac{h}{GC_p} Pr^{2/3} \tag{8}$$

Therefore, h=515.3 W/m$^2$-K.

Using the LIKE algorithm of Rodriguez, the CHE flow channels have the following turbulence characteristics:
Kolmogorov eddy size=4.08e−005 m
Kolmogorov eddy velocity=2.32e−002 m/s
Kolmogorov eddy time=1.76e−003 s
Taylor eddy size=4.41e−004 m
Taylor eddy velocity=6.48e−002 m/s
Taylor eddy time=6.81e−003 s
Integral eddy size=1.47e−004 m
Integral eddy velocity=7.94e−002 m/s
Integral eddy time=1.85e−003 s See S. Rodriguez, *Applied Computational Fluid Dynamics and Turbulence Modeling: Practical Tools, Tips and Techniques*, Springer International Publishing, 1$^{st}$ Ed., ISBN 978-3-030-28690-3, 2019.

Figure 3A:
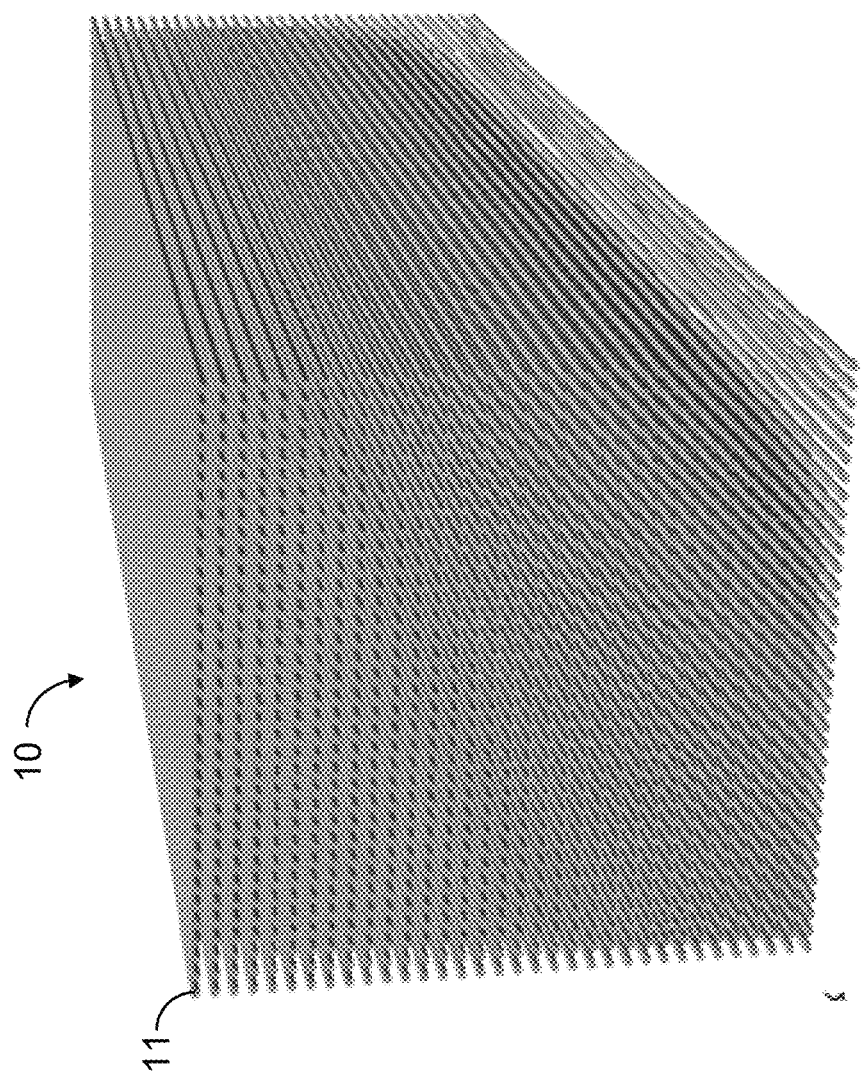
FIG. 3A is a perspective end view illustration of an exemplary compact heat exchanger comprising a 35×35 array of small diameter tubes.

Of particular significance is that the Taylor eddies for this exemplary CHE design are 0.441 mm in length. To allow a reasonable stream of turbulent Taylor eddies to carry significant heat, the channel flow diameter is designed such that five Taylor eddies can flow throughout any given section of the CHE tubes. This implies that the required tube channel diameter D is 2.21 mm. As shown in FIG. 3A, based on a heat transfer balance, the exemplary CHE comprises a total number of 1,242 channels, which can be arranged into a square array 10 of 35×35 tubes 11 constructed in a block of RHEA metal (not shown). The unit array 10 is 0.219 m in width (W) and height (H), with a total length L of 0.215 m. Therefore, the exemplary CHE configuration has L/W=0.98. The CHE dimensions and specifications are listed in Table 1.

Figure 3C:
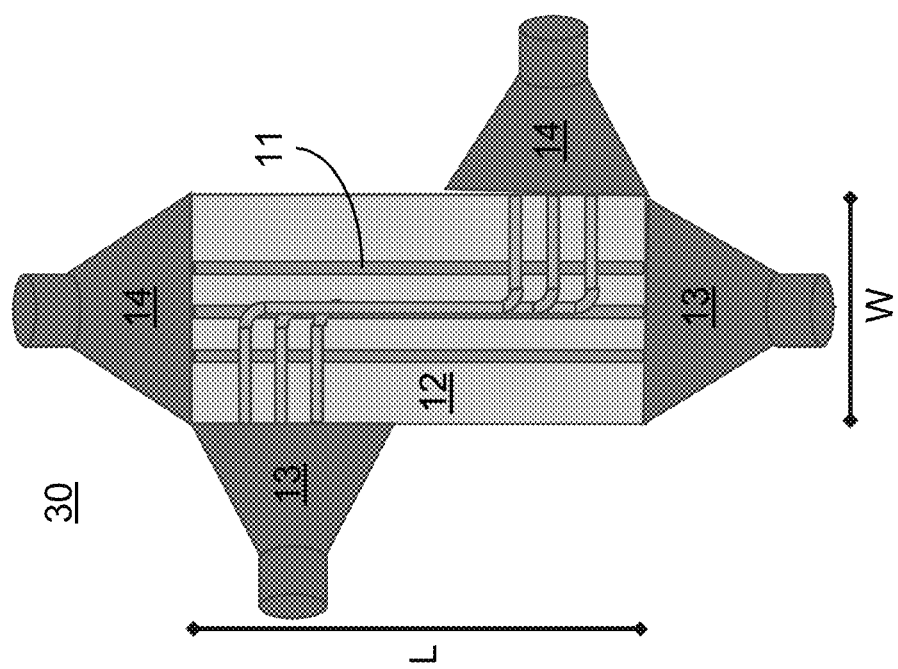
FIG. 3C is a schematic illustration of an exemplary compact heat exchanger with six tubes in counterflow and inlet and outlet plenums.
Figure 3B:
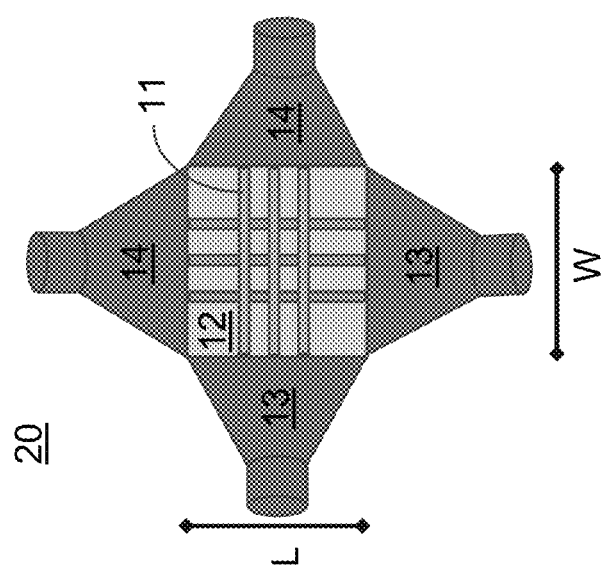
FIG. 3B is a schematic illustration of an exemplary compact heat exchanger with six tubes in cross flow and inlet and outlet plenums.

The 3D-rectangular heat exchanger array 10 in a matrix of RHEA metal 12 can be connected to an inlet plenum 13 comprising a 3D pyramid with a square base that transitions into a cone and a similar outlet plenum 14 on all four sides, as shown in FIGS. 3B and 3C. Each plenum can form a 45° cone that allows maximum inlet and outlet flow, while reducing unnecessary swirl. See U.S. Pat. No. 10,537,839 to D. Fleming and S. Rodriguez, issued Jan. 21, 2010. The CHE can comprise tubes 11 arranged in cross flow 20 or counter-current flow 30, as shown conceptually in FIGS. 3B and 3C, respectively. The cross-flow CHE 20 will have decreased thermal efficiency than the counter-current flow CHE 30. On the other hand, a cross flow arrangement can remove pressure drops associated with 90° bends that may otherwise be required to collect the counter-current flow within their respective plena. For situations where more heat transfer is desired, the heat exchanger length L can be increased. Thus, for configurations having L/W>2 (and up to 5), counter-current flow is recommended. For such situations, the increased pressure drop associated with the 90° bends is offset by the thermal efficiency increase resulting from the counter-current flow. The 90°-bend pressure drop can be minimized by allowing a smooth curvature. Other channel shapes can also be used, including square, rectangular, and elliptical tubes.

As described above, RHEAs are alloys with stable single-phase microstructures, typically with equiatomic distributions of four to six refractory metals (e.g., Ti, V, Cr, Zr, Nb, Mo, Hf, Ta, and W). The high configurational entropy of these alloys is thought to promote solid solutions and with minimal elemental segregation. Therefore, the exemplary CHE can be constructed using a RHEA comprising HfNbTa-TiV, which is estimated to have a compressive yield strength of about 1,300 MPa at room temperature. This yield strength is higher than Inconel 718 in the temperature range from room temperature to about 1,400 K.

TABLE 1

Exemplary RHEA CHE design characteristics.

| Parameter | Dimension/Units |
| --- | --- |
| Heat transfer rating | 500 kW |
| Coolant | $sCO_2$ |
| Mass flux | 46.5 $kg/m^2 - s$ |
| Design type | Cross flow for L/W < 2, Counter-current flow otherwise |
| Ave. convective heat transfer coefficient | 515.3 $W/m^2 - K$ |
| Colburn j-factor (with 20% reduction to account for fouling, etc.) | 0.0072 |
| Re | 2,400 |
| Pr | 0.725 |
| Nu | 15.5 |
| Material | HfNbTaTiV |
| Ave. inlet velocity | 1.07 m/s |
| Tube diameter | $2.21 \times 10^{-3}$ m |
| Number of tubes | 1,242 |
| Tube length (L) | 0.215 m |
| Tube array width (W) | 0.219 m |
| Tube array height (H) | 0.219 m |
| Tube wall roughness | $<4.2 \times 10^{-5}$ m |
| Thickness between tubes | $1.0 \times 10^{-3}$ m |
| Inlet pipe diameter | 0.074 m |
| Plenum length | 0.109 m |
| Plenum angle | 45° |
| Plenum thickness | $5.0 \times 10^{-3}$ m |

Advanced Manufacturing

The heat exchange material must have manufacturability to produce the complex geometries necessary to achieve high-efficiency CHEs. SOA commercial alloys are produced using multistep conventional processing that involve complex post-processing treatments to develop desired component geometries and structure-properties relationships in the material. Further, some alloys such as Inconel 740H and Haynes 282 (the current top candidates for conventional materials) are difficult to produce in tube form. However, the processing, machining, welding, and brazing of superalloys can be difficult due to their higher toughness, low thermal conductivity, tendency to crack during welding, or unavailability of suitable brazing materials.

Hybrid (additive/subtractive) advanced manufacturing (AM) can address some of the challenges of conventional manufacturing. Additive manufacturing can be used to fabricate compact heat exchangers with innovative heat transfer designs. In particular, additive manufacturing can be used to fabricate the complex and compact geometries of high temperature heat exchangers that would otherwise be difficult to fabricate using conventional processing. Hybrid AM uses additive and subtractive processing to produce near net shape component geometries with structure-properties relationships already well suited for the application, with reduced post-processing effort. Therefore, advanced manufacturing can be combined with advanced alloy design to develop high performance compact heat exchangers.

RHEAs are typically produced with conventional casting methods. However, in the context of additive manufacturing, a few reports have been published that demonstrate proof-of-concept for producing large-scale geometries of RHEAs. See I. Kunce et al., Int. J. Hydrogen Energy 39(18), 9904 (2014); H. Dobbelstein et al., Addit. Manuf. 24, 386 (2018). Recently, RHEA was successfully manufactured using hybrid Laser Engineered Net Shaping (LENS). See I. Kunce et al., Int. J. Hydrogen Energy 39(18), 9904 (2014); and Melia et al., App. Mater. Today (2020), in press. Hybrid LENS manufacturing not only greatly extends the SOA, but also allows flexibility in material properties. This enables the RHEA thermal performance and resistance to hostile environments to be increased, as well as the manufacturing of complex geometries not possible via conventional manufacturing. Subtractive manufacturing can be used to control the surface quality of the manufactured heat exchanger.

A hybrid additive/subtractive LENS manufacturing platform can be used to consolidate the RHEA powders for CHE fabrication. See A. B. Kustas et al., Addit. Manuf. 21, 41 (2018); Melia et al., App. Mater. Today (2020), in press; S. Chen et al., Entropy 20, 937 (2018); and B. S. Murty, High-Entropy Alloys, Elsevier (2019). This hybrid manufacturing platform can produce custom alloy compositions from elemental powder feedstock in situ or 'on-the-fly'. This capability is afforded by virtue of having 5 independently controlled powder hoppers and feed lines, which effectively enables tuning of alloy chemistries through direct control of individual powder feeding rates. Alloying can be conducted rapidly in situ to develop a large range of compositions, mechanical properties, and microstructures. Alloy composition and performance can thus be optimized to maintain a suitable combination of low- and high-temperature mechanical strength and ductility. Further, alloy compositions can be spatially graded to enable location-specific improvement in mechanical and corrosion properties. Finally, due to the ability for in situ alloy mixing, off-the-shelf elemental powder feedstock can be purchased for significantly lower cost compared to more expensive pre-alloyed forms that require custom powder production methods.

The present invention has been described as a refractory high entropy alloy compact heat exchanger. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A compact heat exchanger, comprising a plurality of flow channels constructed of a refractory high entropy alloy, wherein a hydraulic diameter of the flow channels is between 2 and 3 mm and the flow of working fluid in the flow channels has a Reynolds Number between 2,200 and 4,000 to minimize pressure drop while maintaining turbulent mixing for heat transfer, and wherein the refractory high entropy alloy comprises at least four of the refractory metals Ti, V, Cr, Zr, Nb, Mo, Hf, Ta, and W and wherein each of the at least four refractory metals are of between 5 and 35 at. % concentration.

2. The compact heat exchanger of claim 1, wherein the refractory high entropy alloy comprises HfNbTaTiV.

3. The compact heat exchanger of claim 1, wherein the refractory high entropy alloy comprises MoNbTaVW or HfNbTaTiZr.

4. The compact heat exchanger of claim 1, wherein the refractory high entropy alloy comprises WTaTiVCr or MoNbHfZrTi.

5. The compact heat exchanger of claim 1, wherein the refractory high entropy alloy is compositionally graded to have corrosion-resistant metals near an exposed surface.

6. The compact heat exchanger of claim 1, wherein the pressure drop in the flow channels is less than 1.5%.

7. The compact heat exchanger of claim 1, wherein the compact heat exchanger comprises an array of flow channels with cross- or counter-current flow.

8. The compact heat exchanger of claim 1, wherein the compact heat exchanger operates at a temperature of greater than 800° C. and pressure of greater than 80 bars.

9. The compact heat exchanger of claim 1, wherein a working fluid comprises supercritical carbon dioxide.

* * * * *